No. 645,782. Patented Mar. 20, 1900.
L. BILAN.
COTTON PICKER.
(Application filed Aug. 21, 1899.)
(No Model.) 2 Sheets—Sheet 1.

Witnesses
George Kane
Finis D. Morris

Ludwik Bilan
Inventor
By Connell Bros.
Attorneys

THE NORRIS PETERS CO., PHOTO-LITHO., WASHINGTON, D. C.

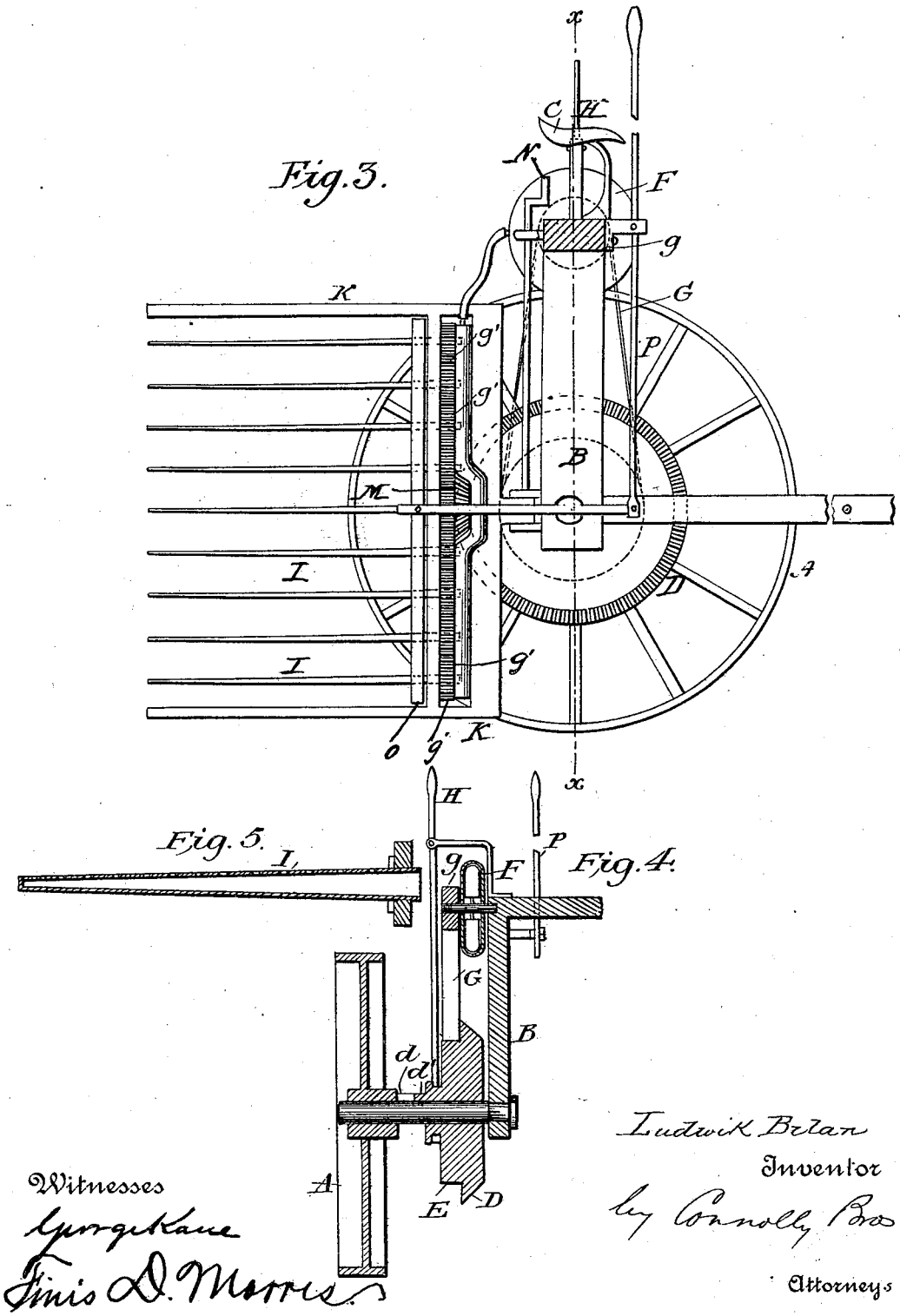

UNITED STATES PATENT OFFICE.

LUDWIK BILAN, OF LEXINGTON, OKLAHOMA TERRITORY.

COTTON-PICKER.

SPECIFICATION forming part of Letters Patent No. 645,782, dated March 20, 1900.

Application filed August 21, 1899. Serial No. 727,998. (No model.)

*To all whom it may concern:*

Be it known that I, LUDWIK BILAN, a citizen of the United States, residing at Lexington, in the county of Cleveland and Territory of Oklahoma, have invented certain new and useful Improvements in Cotton-Pickers; and I do hereby declare the following to be a full, clear, and exact description of the invention; such as will enable others skilled in the art to which it appertains to make and use the same.

This invention has relation to cotton-pickers, and has for its object the provision of novel means for the utilization of atmospheric pressure produced by suction for gathering the cotton from the plants and the provision of means for causing the gathered cotton to adhere to the gathering devices and for removing the cotton from such devices from time to time and depositing it in suitable receptacles carried by the cotton-picking vehicle or harvester.

My invention consists in the novel construction and combination of devices hereinafter described and claimed.

Figure 1:
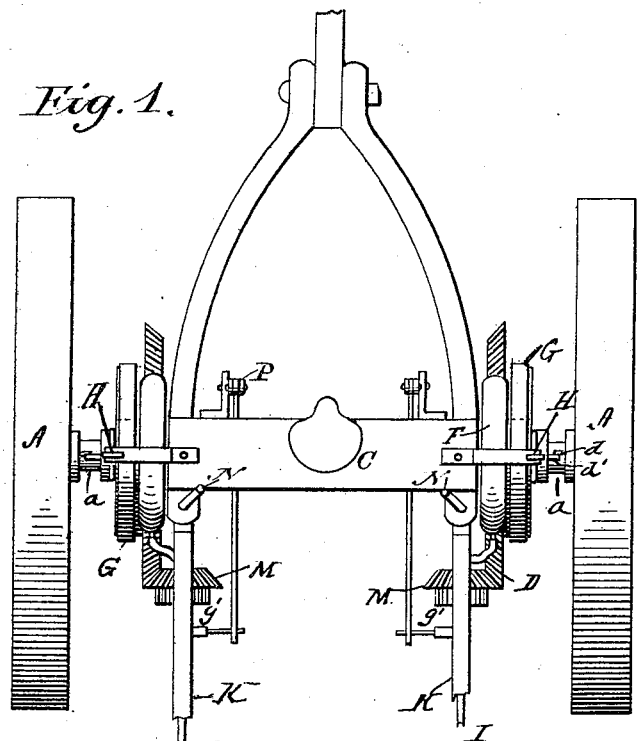
Figure 2:
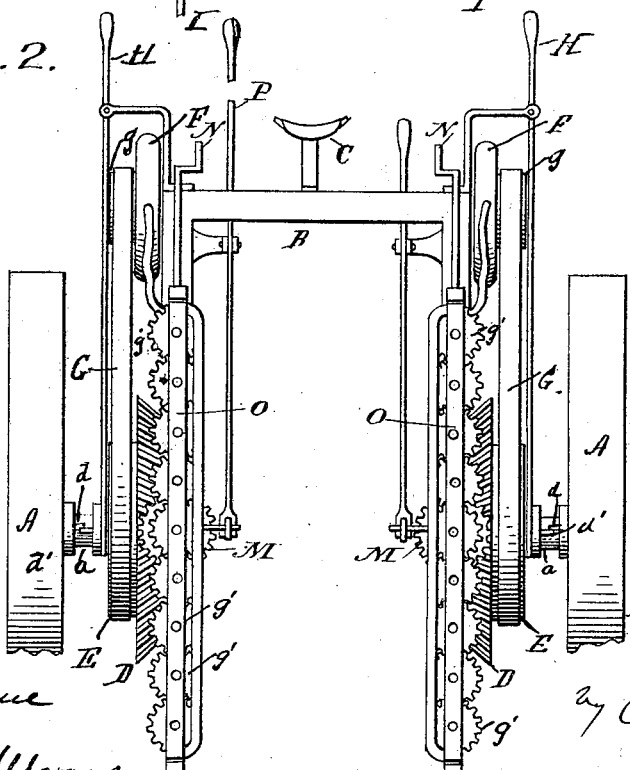

In the accompanying drawings, Figure 1 is a plan view of a cotton-picker embodying my invention. Fig. 2 is a rear end view, and Fig. 3 is a vertical longitudinal section, of the same. Fig. 4 is a vertical transverse section of part of the apparatus on the line $x$ $x$ of Fig. 3. Fig. 5 is a longitudinal sectional view of one of the spindles.

The picker consists of a small vehicle or truck mounted on wheels and provided with a tongue or shafts, so as to be drawn by a horse or horses through the cotton-field.

A designates the wheels of the vehicle, mounted on short shafts $a$ $a$, projecting laterally from a frame, the latter consisting of a bent or arched beam B, which straddles the cotton-plants and is provided with a seat C for the driver. Upon the shafts $a$ $a$ are mounted the bevel toothed wheels D D, through which motion is conveyed to the picking-spindles. These shafts also carry pulley-wheels E, preferably formed on or as parts of the toothed wheels D D and intended to convey motion to the suction-fans F F through belts or chains G G, passing over pulley-wheels $g$ $g$, mounted on the shafts of the fans. The fans F F are attached to the sides of the arched beam B. The shafts $a$ $a$ turn with the wheels A A. The toothed wheels D D and pulleys E E, formed on said wheels, are loosely mounted on the shafts $a$ $a$, so that they may be thrown into and out of engagement with the shafts, and for this purpose the shafts are provided with feathers or clutch devices $d$, adapted to engage with feathers or clutch devices $d'$ on the hubs of the pulleys. A suitable lever H, pivoted on the frame of the vehicle and forked to engage with the collar of the pulley, serves as a means within reach of the driver for the engagement and disengagement of the toothed wheels D M.

The cotton-picking devices proper consist of the hollow perforated spindles I I, having their inner ends journaled in suitable vertical frames K K and leading into tubes K', attached to said frames, and communicating by flexible connections with the fan-cases. These spindles are adapted to lie horizontally, with their free ends toward the rear of the vehicle, so that as the vehicle moves forward the two series of spindles shall embrace the row of plants, touching and gently pressing the cotton-bolls and entering into the plants as far as possible without injury to the same. Rotary motion is imparted to the spindles from the toothed wheels D D through a series of intermeshing pinions $g'$ $g'$, mounted on the inner ends of said spindles, the middle spindle of each series being prolonged and provided with a beveled pinion M, engaging with a toothed wheel D. The frames K K, upon which the spindles and their pinions are mounted, are pivotally attached to the arched frame of the vehicle, so that they may have a little adjustment in order that the spindles may be slightly moved inwardly at their rear ends to act as combs on the plants and enter more deeply between the bolls. This adjustment is effected by the driver according to requirements through suitable levers and connections N N.

The spindles are tubular and perforated along their sides. The suction produced through these perforations by means of the fans causes the cotton to leave the plants and to adhere by atmospheric pressure to the spindles upon which by the rotary motion of the spindles the cotton is wound or spun.

Upon each frame K is mounted a perforated bar or cleaner O, which slides back over the spindles and is coupled by a pivotal rod to a suitable lever P, pivoted to the arched beam. When the spindles are full, the driver by properly manipulating the lever moves the cleaning-bar outwardly, and thus removes the gathered cotton into a suitable box or receptacle carried by the vehicle in the rear of the frame K.

Having described my invention, I claim and desire to secure by Letters Patent—

1. In a cotton-picker, the combination with a vehicle mounted on wheels, and provided with one or more suction-fans of frames having mounted thereon hollow rotary spindles arranged to contact with the cotton-bolls, and connected with the fan-cases by suitable tubes, said spindles being perforated on their sides and adapted to gather the cotton by atmospheric pressure, and to hold the same by winding or spinning substantially as described.

2. In a cotton-picker, the combination with a vehicle mounted on wheels, and provided with one or more suction-fans of a series of rotary perforated spindles communicating with the fan-cases, mechanism for rotating said fans and spindles so as to cause the latter to gather and hold the cotton, and means for removing the gathered cotton from the spindles, substantially as described.

3. In a cotton-picker, the combination with a vehicle mounted on wheels, and provided with one or more suction-fans, and one or more series of rotary, perforated spindles, communicating with the fan-cases, of frames upon which said spindles are mounted, said frames being adjustable, means for adjusting said frames to different positions, mechanism for rotating said fans and spindles from the axles of the vehicle and means for connecting the spindles to and disconnecting the same from the main driving mechanism, substantially as described.

4. A cotton-picker, comprising a suitable vehicle mounted on wheels and a series of perforated, rotary spindles adapted to embrace the cotton-plants, in combination with a suction fan or fans, the cases of which communicate with the hollow spindles, and means for driving said fans and spindles, substantially as described.

In testimony whereof I affix my signature in presence of two witnesses.

LUDWIK BILAN.

Witnesses:
 JOS. B. CONNOLLY,
 SIDNEY BIEBER.